US009667955B2

United States Patent
Falk (10) Patent No.: US 9,667,955 B2
(45) Date of Patent: May 30, 2017

(54) METHOD OF CALIBRATING A CAMERA (71) Applicant: BodyBarista ApS, Copenhagen S (DK)

(72) Inventor: Peter Falk, Copenhagen V (DK)

(73) Assignee: BODYBARISTA APS, Copenhagen S (DK)

(*) Notice: Subject to any disclaimer, the term of this patent is extended or adjusted under 35 U.S.C. 154(b) by 0 days.

(21) Appl. No.: 14/432,960

(22) PCT Filed: Sep. 30, 2013

(86) PCT No.: PCT/DK2013/000062
§ 371 (c)(1),
(2) Date: Apr. 1, 2015

(87) PCT Pub. No.: WO2014/053137
PCT Pub. Date: Apr. 10, 2014

(65) Prior Publication Data
US 2015/0249822 A1 Sep. 3, 2015

(30) Foreign Application Priority Data
Oct. 1, 2012 (DK) .................................. 2012 00590

(51) Int. Cl.
G01C 11/00 (2006.01)
H04N 17/00 (2006.01)
(Continued)

(52) U.S. Cl.
CPC ........... H04N 17/002 (2013.01); G01B 11/02 (2013.01); G01B 21/042 (2013.01); G01C 11/00 (2013.01); G01C 25/00 (2013.01)

(58) Field of Classification Search
USPC ................................. 348/187, 207.99, 222.1
See application file for complete search history.

(56) References Cited

U.S. PATENT DOCUMENTS 7,307,655 B1 * 12/2007 Okamoto ........... G06K 9/00791
348/222.1
7,321,839 B2 1/2008 Maeda et al.
(Continued)

FOREIGN PATENT DOCUMENTS

DE  10 2010 004 233 B3   7/2011
EP     0 880 008 A2     11/1998

OTHER PUBLICATIONS

International Search Report mailed in International Patent Application No. PCT/DK2013/000062 (Dec. 2013).

Primary Examiner — Paulos M Natnael
(74) Attorney, Agent, or Firm — Michael Best & Friedrich LLP (57) ABSTRACT The invention relates to a method of performing an absolute length calibration for an object (20) located with or covered by a camera device (15) in a mirror (10), the method comprising the steps of determining dimensions of the camera device (15) based on the type of the camera device (15), capturing an image of the camera device (15) with an image of the object (20) with the camera device (15), measuring a length on the image of the object (20) and measuring dimensions of the camera device (15) from the captured image, and using the determined dimensions of the camera device (15), the measured length of the image of the object (20) and the measured dimensions of the camera device (15) to calibrate the length of the object (20).

9 Claims, 11 Drawing Sheets (51) Int. Cl.
*G01B 11/02* (2006.01)
*G01C 25/00* (2006.01)
*G01B 21/04* (2006.01)

(56) References Cited

U.S. PATENT DOCUMENTS

| | | | |
|---|---|---|---|
| 7,479,982 B2* | 1/2009 | Otani | G01C 11/06 |
| | | | 348/175 |
| 8,941,561 B1* | 1/2015 | Starner | G09G 5/00 |
| | | | 345/7 |
| 9,239,460 B2* | 1/2016 | Sylvan | G02B 27/0149 |
| 2004/0061831 A1* | 4/2004 | Aughey | A61B 3/113 |
| | | | 351/209 |
| 2004/0066454 A1* | 4/2004 | Otani | G01C 11/06 |
| | | | 348/188 |
| 2004/0141063 A1 | 7/2004 | Maeda et al. | |
| 2005/0157953 A1 | 7/2005 | Ney | |
| 2012/0170922 A1 | 7/2012 | Shuster | |

* cited by examiner

METHOD OF CALIBRATING A CAMERA

CROSS-REFERENCE TO RELATED APPLICATIONS

This is a U.S. national stage entry of International Patent Application No. PCT/DK2013/000062, filed on Sep. 30, 2013, which claims priority to Denmark Patent Application No. PA 2012 00590, filed on Oct. 1, 2012, the entire contents of all of which are fully incorporated herein by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

Not Applicable.

BRIEF SUMMARY OF THE INVENTION

This invention relates to a method of performing an absolute length calibration for an object located with or covered by a camera device in a mirror by knowing the camera device model or, by use of image recognition to find specific characteristics like logo, length to width ratio, or other characteristics to determine type of the camera device model, and use of a camera device, or parts or characteristics of the camera device, as a calibration object, as seen in a captured image, such as an image taken of the camera device in a mirror.

The invention also relates to a method to performing an absolute distance calibration to a camera device, by knowing the above image calibration, and camera device model, as seen in a captured image, such as an image taken of the camera device in a mirror.

The invention also relates to a method of performing an absolute angular calibration between the camera device and the mirror, by the camera device location as seen in a captured image, such as an image taken of the camera device in a mirror. Further, a method of performing an absolute angular calibration of a mirror, by subtracting the tilt of the camera device with the absolute angular calibration between the camera device and the mirror.

This invention also relates to a method of performing an absolute length calibration for an object with a camera device in a mirror, as seen in a captured image, where the object plane relative to the calibrated camera device viewing plane is known by distance between the camera device and the object, by angle between the camera device and the mirror, and/or by angle of the mirror.

The invention also relates to a method of performing an absolute length calibration for an object located with or covered by a paired remote device knowing the paired remote device model or, by use of image recognition, to find specific characteristics like logo, length to width ratio, or other characteristics to determine type of the camera device model, and use of a camera device, or parts or characteristics of the camera device as a calibration object, as seen in a captured image, where both the paired remote device and the object is seen.

The invention also relates to a method of performing an absolute length calibration for an object, as seen in a captured image, where both the paired remote device and the object is seen, where the object plane relative to the calibrated paired remote device viewing plane is known by distance between the paired remote device and the object, and/or by angle of the camera device.

It is known in the art that absolute length measurement of objects in an image can only be done by two different principles:

1) Monocular: Known calibration objects in the image or the setup, e.g. calibration T, chess board walls and floors, or object of known size, e.g. credit card, A4 paper, etc. The user needs to insert these calibration objects into the image and needs to register the calibration object, as it is not known by the image itself. It is also known that if the setup is stationary or semi-stationary, such as in a car, the length distance on a parallel plane of the ground can be calibrated by matching marks of known distances with the location of the marks on the image. This can also be done by extending the parallel plane with an infinitive image plane generated from two parallel mirrors, as stated in United States Patent Application Publication U.S. Pat. No. 7,321,839 B2 "Method and apparatus for calibration of camera system, and method of manufacturing camera system" as known in the art.

2) Stereo: Two or more cameras that are calibrated so that the angles and distances between the cameras are fixed and known. The absolute measurement of length can be done by triangulation by knowing the angle to the start and end of the object for both cameras. The position and angle between the cameras need to be known and the multiple camera setups need to be calibrated in advance or at the factory.

The principle of an optical system, such as the camera, is that a Field of View, typically 40° to 50°, is projected on to the image plane where the image is produced. The Field of View will vary with the focal length of the system, such as when using an optical zoom, and can be recorded by image capturing software or meta data. Digital zoom, will in the same way, decrease the Field of View, and can be recorded by image capturing software.

A cone of light is projected onto the image sensor element. Thus, you cannot know the actual length of the object, L, in an image from its number of pixels, N. Therefore a flower can be photographed close to the camera device and fill the whole field of view. By contrast a tree farther away can fill up the same field of view. These two objects can have the same pixel counts, but obviously have different real dimensions. This calls for some kind of calibration of the captured area in case somebody should need to perform a true scale measurement of a part or parts of the captured area.

A lot of thought is put into in the design of a lens system to eliminate aberration in the image. These involve point aberrations and distortions and higher terms of aberrations.

If distortion is not eliminated, the image will have varying magnification over the plane. Straight lines will then bend in the outer sides of the image creating barrel distortion or pincushion distortion. Good design and/or factory pre-calibration or software calibration of the image can prevent this. The invention is intended to be used on a distortion free image, or in parts of an image where the distortion can be said to be constant or known, either by design or by factory pre-calibration or other post processing of the image.

A common image analysis task is to separate the foreground from the background and obtain the silhouette cone of the object of interest. This cone is still an angle of the 3D world and the same object closer to the camera device will have a larger pixel count than the same object farther away. There is therefore a need of making pixel size calibrations for each image taken as the distance to the object can and will vary.

It is known to the art that each plane parallel to the viewing plane in the scenery will give a perspective caused by its distance. It is also know to the art that the angle of a plane in relation to the viewing plane will project on the viewing plane according to cosine of the angle. Both the perspective and projection can be calibrated for any imaging system, by the distances and the angles between a calibrated viewing plane and an object surface or plane.

3D scanners known to the art can make real measurements of humans and other 3D objects. They are made of calibrated laser sensors measuring the distance at every point to the object, or calibrated imaging set-ups with multiple views where the cones can be overlapped and a 3D map created. But all these presented systems are either large or not easily operated by the user.

At the beginning of the digital era, computers were big and bulky, and reserved to scientists. The revolution of personal computers, and later mobile computers and mobile devices, has shifted the power of the possibilities from the few to the masses. Similarly the digitalization of camera image taking has made it easy to take any amount of pictures for any personal interest without the disadvantage of paying per picture or having to self-censure the pictures due the photographic processing by company personnel. In the era of social media and accessible camera devices everywhere, people are both used to and comfortable with taking self-portraits and comparing pictures of themselves. The availability of camera devices and computational power should therefore be able to empower the user with self-controlled measurements.

For a mobile camera device system, not only a calibration of a viewing plane is sufficient for versatile calibration of an object. A more precise calibration can be made by registering additional information about the scenery.

One example is if a user is instructed to stand in front of a bathroom mirror, the mirror can be assumed to be hanging on the wall, and the user can be assumed to be standing upright. Instructing the user how to stand and/or statistical or empirical studies can determine the distance between the camera device and the user. The Cartesian coordinate systems for the mirror and the user can be transformed, by shift and rotation, so that origo becomes the camera device with z direction along the optical axis. An object on the user can be transformed onto this coordinate system, by registering the calibration of the camera device viewing plane, the distance to the camera device viewing plane and the angle between the mirror and the camera device, together with the known data from above. The relation between the object plane and the camera device viewing plane in this coordinate system calculates a perspective and projection factor for each point in the captured image.

Another surrounding would be if the mirror were standing with an angle. Additional information about the tilt angle of the camera device, registered by a built-in gyroscope or a built-in magnetometer will together with angle between the camera device and the mirror, give the angular calibration of the mirror. Transforming the object plane with regard to the mirror plane into the camera device coordinate system, will calibrate the absolute length of the object for perspective and projection.

For a rectilinear system, the object can be calibrated by solely knowing: the perpendicular signed distance to the point on the object, $d_{object\ point} - d_{calibration\ plane}$, from the calibration viewing plane, the distance to the calibration viewing plane $d_{calibration\ plane}$, and a calibration for the known viewing plane.

The calibrated viewing plane is represented in a Cartesian coordinate system, with the normalized unit vector parallel to the optical axis along the z-direction, n, perpendicular to the calibrated viewing plane as (0,0,1) and a point in the calibrated viewing plane such as the position of image of the camera device $(c_x, c_y, c_z)$, giving calibrated viewing plane as:

$$z - c_z = 0$$

any point on the object $(p_x, p_y, p_z)$ will then have the distance to the calibrated viewing plane as:

$$d_{object\ point} = p_z$$

It is also known, that the tangent plane of the object surface or object plane at the point $(p_x, p_y, p_z)$ will be seen by the camera device as the projection of that plane onto the viewing plane.

The projection is $(\cos \theta_x, \cos \theta_y)$ in each direction.

The calibration for the point of the object, in both directions of an image, is therefore:

$$C_{object\ point}(x, y) = C_{calibration\ plane} * \frac{d_{calibration\ plane}}{d_{object\ point}} * \left( \frac{1}{\cos \theta_x}, \frac{1}{\cos \theta_y} \right)$$

Accordingly, the length of a line between two points on the object surface or object plane is the integration of each calibrated point along the line.

Modern people are somehow obsessed about how they look, and many consider their body as a tool that could and should be shaped and trimmed by exercise. E.g., is the body—or the body parts—losing or gaining size by looking at the physical appearance of the body instead of standing on a bathroom scale. In a modern world many people like to take photos of themselves to document the measurements of their limbs, stomach etc. This can be done by taking a photo when the person is standing in front of a mirror. The camera—carried by the person—will thereby take the mirrored image of the person.

Images can have some relevance without being able to calculate the absolute length dimensions of the objects of interest. Sometimes it can be of interest to look at relations in the image and by this, calculating ratios. The images need to be distortion free and the object needs to be positioned relative to the camera device so that angular and perspective distortion is within acceptable level for the usage. Two images taken at different times can be compared, by superimposing the same object over each other. The percentage difference in areas of interest can be calculated.

There are several areas of interest for absolute length measurements. For humans such areas can be: health, fitness, and garment.

1) Health. Some health related relative measurements can be extracted without knowing the absolute length within the image, e.g. waist to hip ratio (WHR). However absolute length measurements, such as sagittal abdominal diameter (SAD), can be a better indicator of health risk for certain diseases.

2) Fitness. Ratios can somewhat be used to track aesthetics, such as the hourglass shape for females or the V shape back for males, but with the modern view of the body as a tool, there is an increased interest in real measurements, comparison and tracking of progress in real numbers.

3) Garment. Tailors need the real length measurements to sew the garment. In the global market, the tailor and user seldom physically meet and the tailor measurements need to be taken remotely by the user.

However this raises the problems of how to exactly obtain the various measurements of body parts from an image, since the person may stand at varying distances from the mirror thus two images cannot be used and compared to estimate how e.g. the biceps or the hips have increased or decreased.

In other words some way(s) of calibrating and measuring from photos are becoming a requirement.

It is therefore one object of the present invention to be able to derive accurate measurement from a mirrored image taken by a camera by seamlessly calibrating the pixel size at the area of interest.

It is also an object of the present invention to derive information of the scenery, such as the angle between the mirror and the camera device. Accurate angle detection and distance can be used for Augmented Reality.

Another object of the invention is to use the distance and angle information of the scenery to calculate perspective and projection of an object to seamlessly calibrate the absolute length of the object.

According to the invention absolute length measurements can be made by one single monocular camera device using the device itself, e.g. length or width of the camera device, or specific characteristics of the camera device, e.g. lens diameter, lens to edge length, length or width of digital screen, a specific pattern of the camera device, or a digital calibration image or object known by the camera device, e.g. a chess pattern or a ruler pattern on a front facing screen, or a remote device that is known and paired by the camera device. In all these absolute length calibration examples the camera device itself, parts of the camera device, or digital calibration screen can be seen in the image itself by taking the image in e.g. a mirror or in another reflecting surfaces e.g. polished metals such as a polished steel surface, which all function as a mirror and reflects the image back.

According to the invention the distance to the camera device viewing plane can be seamlessly calibrated by the above calibration and the Field of View of the camera device itself, when taking the image in a mirror.

Also according to the invention the angular calibration between a camera device and a mirror, in which the camera device takes an image of itself, can be seamlessly determined by the location of the camera device reflection in the captured image.

The advantage is twofold:
1) The user is not required to insert any calibration object into the settings.
2) The user is not required to enter any information for the calibration process.

The calibration process therefore becomes seamless and user-friendly.

BRIEF DESCRIPTION OF THE SEVERAL VIEWS OF THE DRAWING(S)

The present invention is further described in more detail with reference to the accompanying drawing, in which.

DETAILED DESCRIPTION OF THE INVENTION

Reference numerals with same numbers applied in the figures are intended to have the same meaning through the following description.

Figure 1:
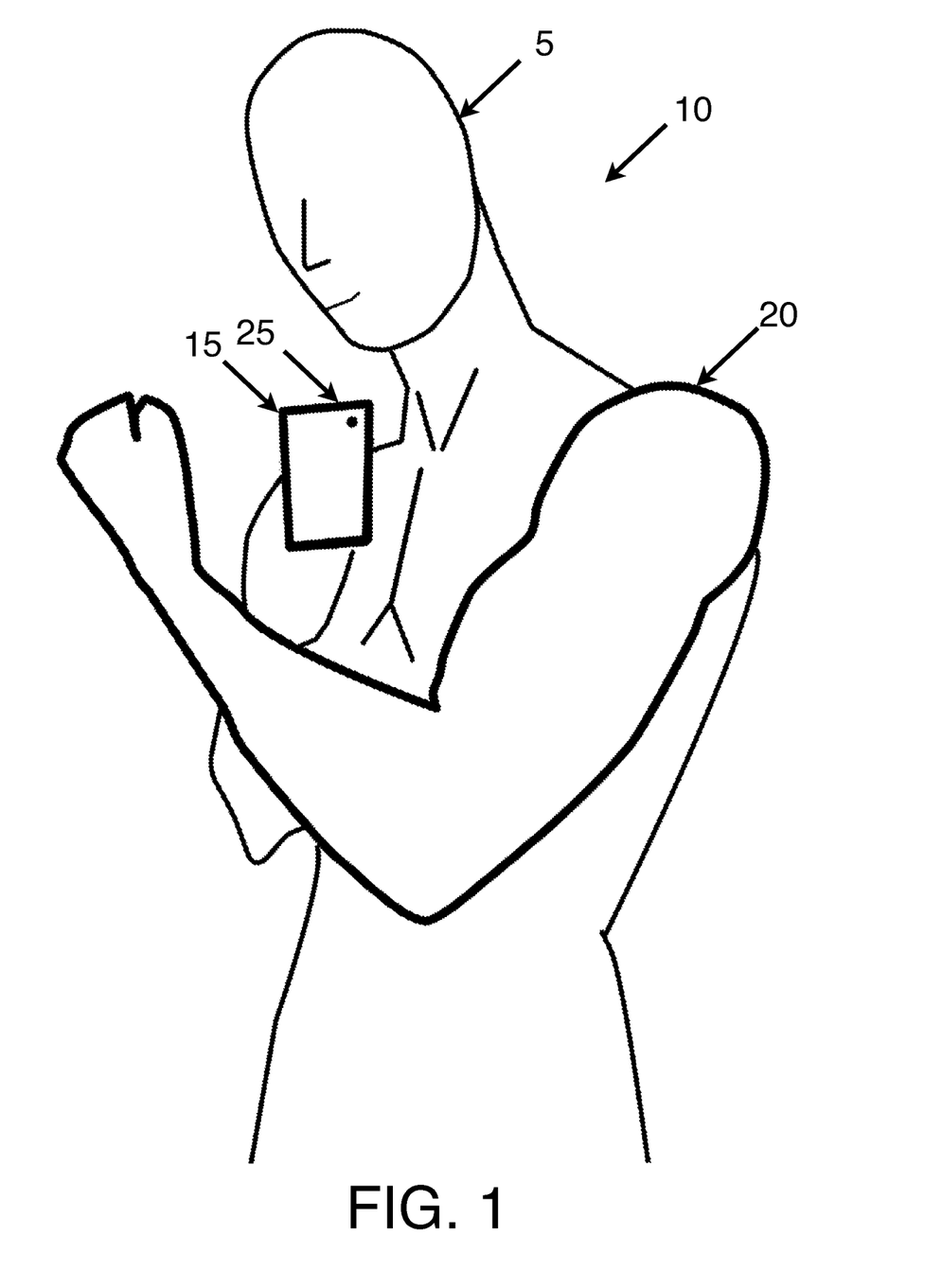
FIG. 1 illustrates an absolute length calibration for a part of an image.

FIG. 1 illustrates an absolute length calibration of a part of an image, for measuring an object e.g. the arm. The absolute length calibration of the object in the image can be done by the user taking an image of herself or himself 5 or another object in a mirror 10. The metadata 110 (see explanation in connection with FIG. 2) of the digital image 105 or the software where the image was captured with will give information about the model 170 of the camera device in use 15, e.g. smartphone model, compact camera model, or SLR camera model. The in situ software or post processing software will use this information to look up 120 dimensions of the camera device model 170 (see explanation in connection with FIG. 2) e.g. lens diameter, lens to edge length, length or width of the camera device, screen dimensions, or a specific pattern and/or features or characteristics on the device 25. The dimensions will be divided by the pixel count 205 (see explanation in connection with FIG. 2) of the camera device 15 or its characteristic 25. The object 150, e.g. the arm length of the user 20, will be measured by counting the pixels 200 (see explanation in connection with FIG. 2) and use the calibration 300 as explained in connection with FIG. 2.

Figure 2:
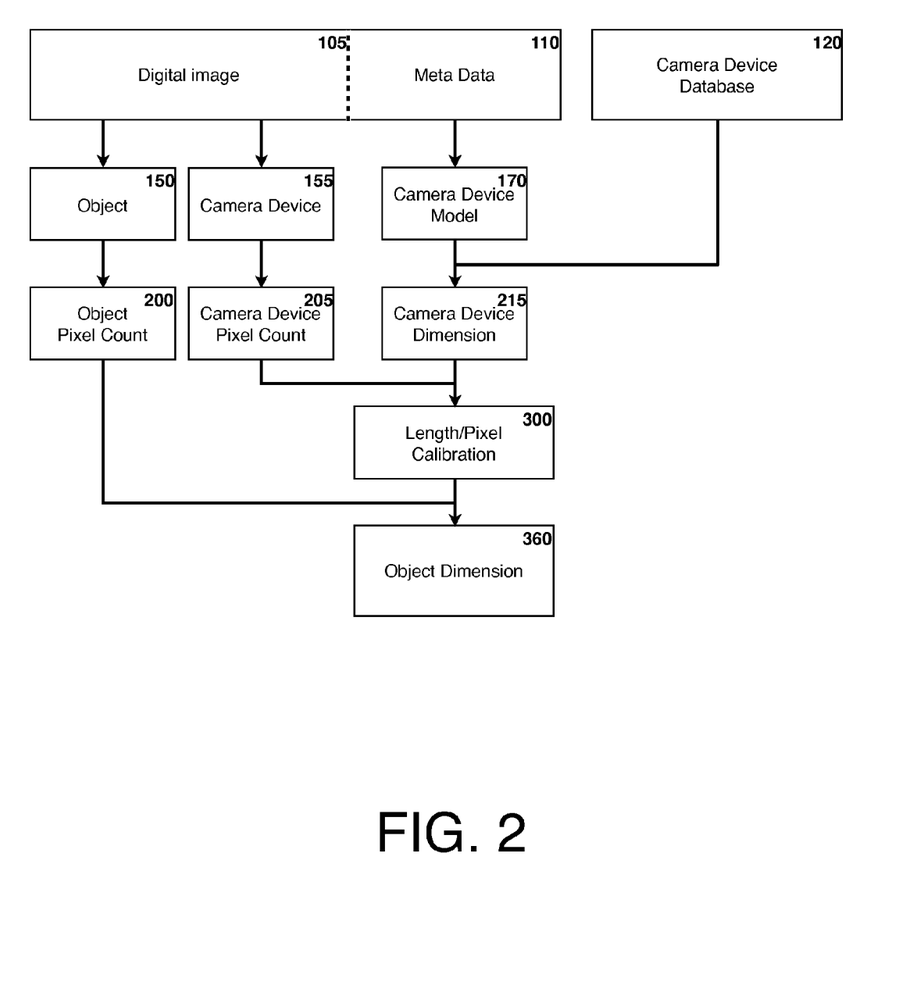
FIG. 2 illustrates a block diagram of image software that can be used for measuring the absolute length for a part of an image.

FIG. 2 illustrates a block diagram of image software that can be used for measuring the absolute length for a part of an image. The digital image metadata 110 or the software where the image was captured with will give information of the camera device in use 170, e.g. smartphone model, compact camera model, or SLR camera model. The in situ software or post processing software will use the information about the camera device model 170 to look up dimensions 215, e.g. length or width, of the camera device model 170 and/or features or characteristics on the camera device model 170 from a local or web based database or a look up table 120.

The software will find the image of the camera device 155 in the image 105 and read the pixel count of the dimensions and/or features or characteristics 205. A length to pixel calibration 300 will be made seamlessly of the user from the above data.

The image of the object 150, e.g. the arm length of the user 20, will be measured by counting the pixels 200 and use the above calibration 300 to calculate the absolute length dimensions of the object 360.

In an embodiment of the invention—shown to illustrate a practical way of carrying out the invention—the invention is carried out in a method comprising steps.

The method performs an absolute length calibration for an image of an object 150, the object 20, e.g. an arm in FIG. 1. is located with the camera device 15 in a mirror 10. However, the object 20, the arm could as well be covered or partly covered by the camera device in the mirror 10.

The software carrying out the method determines at least one of the camera device dimensions 215. The dimensions of the camera device are based on the type or kind of the camera device 170 and reflect the real physical dimensions of the camera device. E.g. if the camera device 15 is one of the known in the art iPhones, i.e. iPhone, iPhone 3G, iPhone 3GS, iPhone 4, iPhone 4S or iPhone 5, the dimensions of the camera device could be the dimensions of the outer contour of the device, for instance the length or the width of the iPhone in the mirror 10.

The method captures an image 105 of the camera device 155 with an image of the object 150, e.g. the arm 20 with the camera device 15. Thereafter the method measures an image length of the object 200, e.g. the size of the arm, and further measures at least one dimension of the image of the camera device 205 from the captured image 105. In the example given the camera device's software measures the size of the arm 200 as well as the length of the camera device 205 or the width of the camera device 205, or both.

It is an embodiment of the invention that the method also can be incorporated into a camera device, to manufacture a camera device for performing an absolute length calibration.

Horizontal and lateral lines will have the same calibration in a well-designed optical system with squared image sensor elements. It is therefore sufficient to measure one dimension to calibrate the image. One extra orthogonal dimension can be used to increase the accuracy but will be needed if the calibration differs in the horizontal and lateral direction.

Let us assume that the real physical dimensions of the camera device 15 are height 115.2 millimeters and width 58.6 millimeters, actually the dimensions of the iPhone 4GS, and the width of the camera device 155 pixel count 205 from the captured image 105 are 290 pixels, then the calibration 300 becomes 58.6/290=0.202 mm/pixels. If the upper arm length of the arm 20 captured image 150 is 2000 pixels 200, its real physical length then is 404 millimeters 360.

The example above has used a part of the users body as the object for which to find the calibration for the absolute length. This object does not need to be a part of the user but can be any object that the user is showing in the image and is being defined by the user or by software.

The software for analyzing the image could use methods of silhouetting known in the art, which can give a sub-pixel resolution. Further accuracy can use the information of typical image distortion for the known camera device model 170. Perimeters can be calculated by use of statistical correlation to one or more widths of the body part of interest, e.g. biceps, extracted from one or multiple images from different views.

It is within the spirit of the invention—in other embodiments of the invention—that the width and height of the camera device 15 may be replaced by lens diameter of the camera device 25, or one or more lens to edge lengths of the camera device, diagonal length of the camera device, screen dimensions, or a specific pattern of the camera device, e.g. a logo or other visible parts on the same side of the camera device 25, e.g. distances between physical buttons on the camera device 15.

Figure 3:
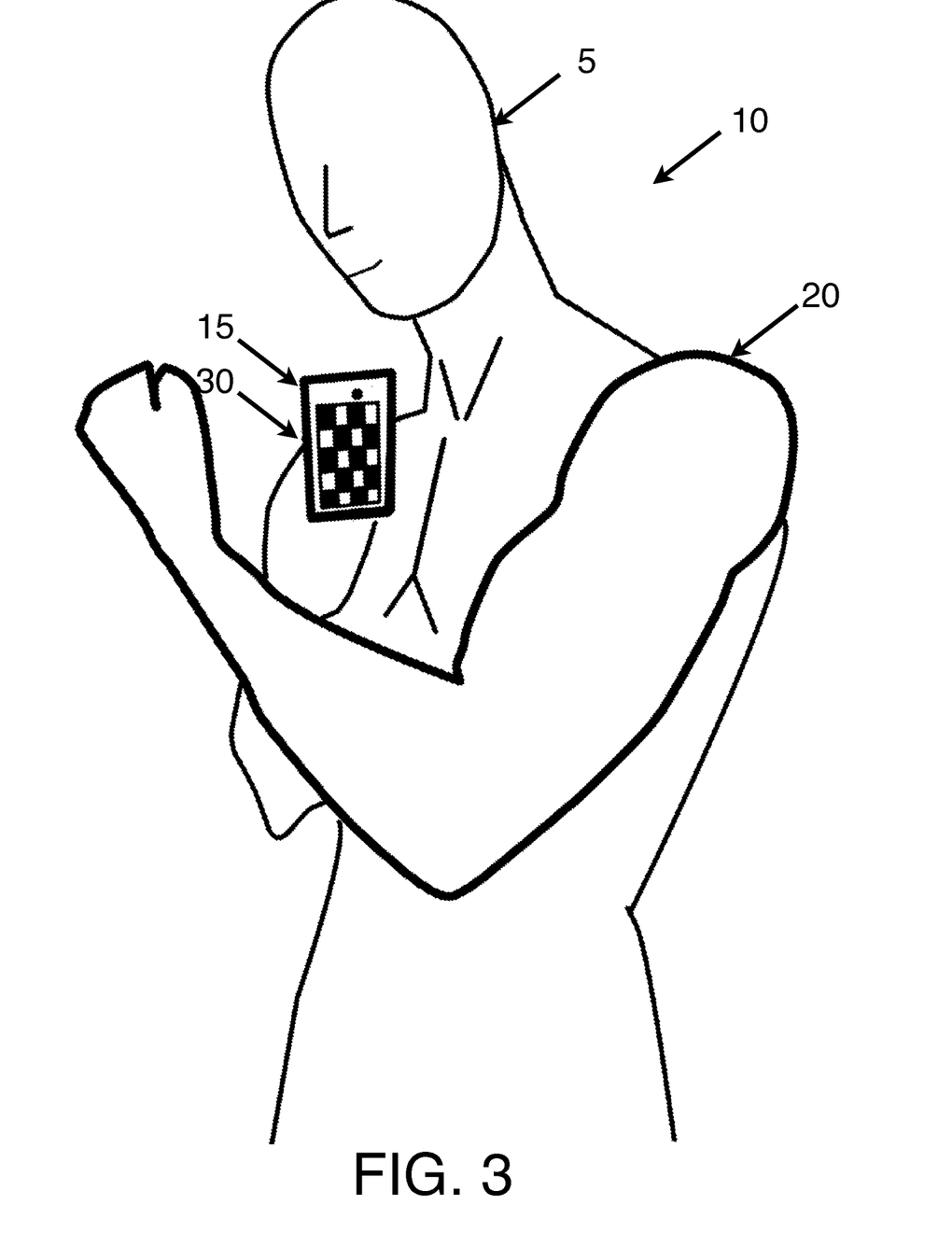
FIG. 3 illustrates how a digital calibration pattern is used to absolute length calibrate a part of an image.

FIG. 3 illustrates how a digital calibration pattern is used for absolute length calibration of a part of an image. In another application, the user 5 will show the screen of the camera device 15 in the image, e.g. if the camera device and screen are on the same side of the device and an image is taken in a mirror 10. The calibration pattern 30 or the calibration object 30 on the camera device 15, and is known by the image capturing software, is used as calibration in the same way as other camera device feature mentioned above. The object, e.g. the arm 20 of the user 5, will be measured by measuring the length per pixel calibration 300 and use the above calibration.

Another application is when the digital calibration image contains patterns that can be understood by the image software, e.g. ruler with marks or symbols per inch or cm 30, or standardized color-codes on calibration pattern 30 commonly known or easily looked up in tables by software. In these cases the absolute length calibration can be done automatically by post processing software not using the image metadata 110 but only image recognition. The calibration proceeds in the same way as other camera device characteristics 25 mentioned above.

The dimension of the image does not have to be the smallest known picture length, pixel, but can be a length in inches or millimeters, if the physical dimension of the image sensor is considered or if an image taken or reproduced analog. Then the above mentioned embodiment of e.g. a ruler on the digital screen 30 will have a certain length of the image or image plane, in fraction of inches or millimeters, and an absolute real length stated by the ruler 30, in inches or centimeters.

Figure 4:
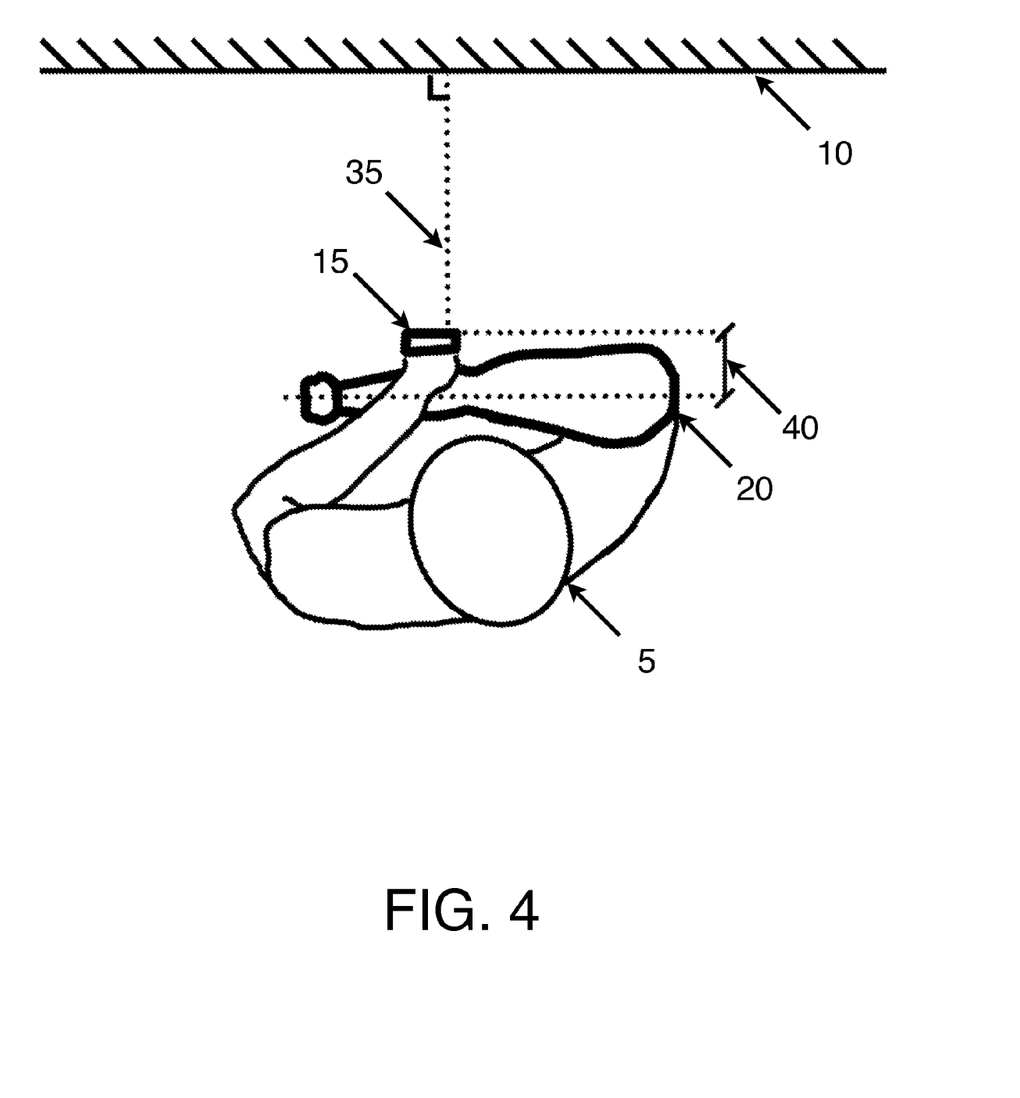
FIG. 4 illustrates one embodiment of the invention how absolute length calibration can be calculated from perspective.

FIG. 4 illustrates one embodiment of the invention how absolute length calibration can be calculated for perspective. The embodiment of the invention can calibrate the distance to the camera device 15, the distance to the object 20, or the distance to the object 20 plane, and use the distances to the camera device 15 and the object 20 to calibrate the perspective by, in the rectilinear case, multiplying the distance to the object plane and dividing by the distance to the camera device calibrated viewing plane.

Figure 5:
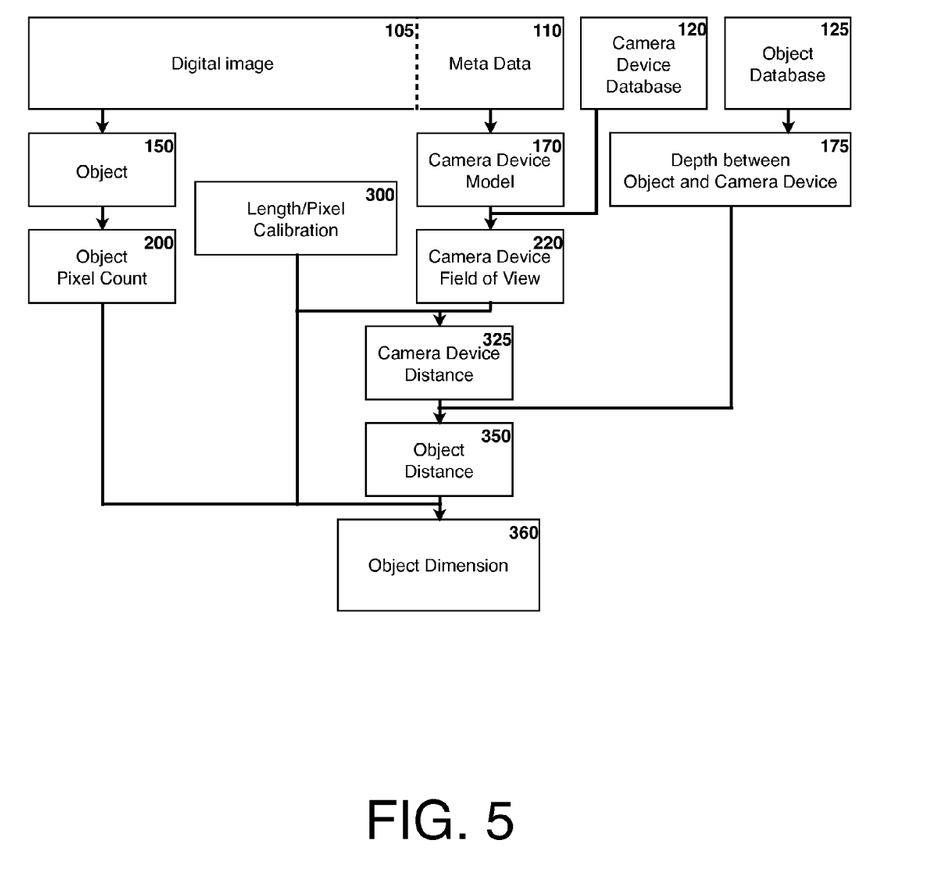
FIG. 5 illustrates a block diagram of image software of one embodiment of the invention how software can be used for measuring the absolute length of a part of an image with perspective.

This distance 40 between the camera device 15 and the object 20, can be assumed to be known, either by instructing the user 5 how to pose, or by empirical or statistical measurements on how users position the camera device 15 in relation to their body part 20. As seen in the block diagram of image software of one embodiment of the invention, in FIG. 5, the camera device model 170 is looked up in a table or database 120 to find the Field of View 220. Metadata 110 or the image capturing software can further register the optical zoom and other features that might change the focal length and therefore the Field of View 220. It is known that the distance to length per pixel calibration 300 is linear for a static Field of View 220. This is used to calculate the distance between the mirror and the camera device 325. As the distance between the object 20 and the camera device 15 is known 175 by the instructions or empirical/statistical data in a database 125 or by other type of image recognition, such as angle of the arm holding the camera device 15, this distance can be added to the camera device distance 325, giving the object distance 350. The pixel count 200 of the object 150, together with the length per pixel calibration 300, and the calculated object distance 350 will give the absolute length dimensions of the object 360, e.g. the arm 20. The extra distance between the camera device plane and the object plane will make this perspective, which can be compensated with the above method.

If the image is autofocused by the camera device 15, the Field of View 220 can be further specified by iteration the calculated camera device distance 325 with the looked up Field of View 220, knowing that the magnification will slightly increase going from infinity focus.

For rectilinear systems, the arctangent of the Field of View 220 is inversely proportional to the magnification+1. The magnification for such a system is the focal length divided by, the focus distance 325 subtracting the focal length. The focal length for common mobile phones is 3.85 millimeters, which are rectilinear systems, gives accurate Field of View 220 for focus made on objects 20 farther than a few centimeters.

In the three-dimensional, the distance to the object 20, and the compensated perspective, will give a calibration for the whole plane, when the object 20 lies, parallel to the viewing plane of the camera device 15.

Figure 6:
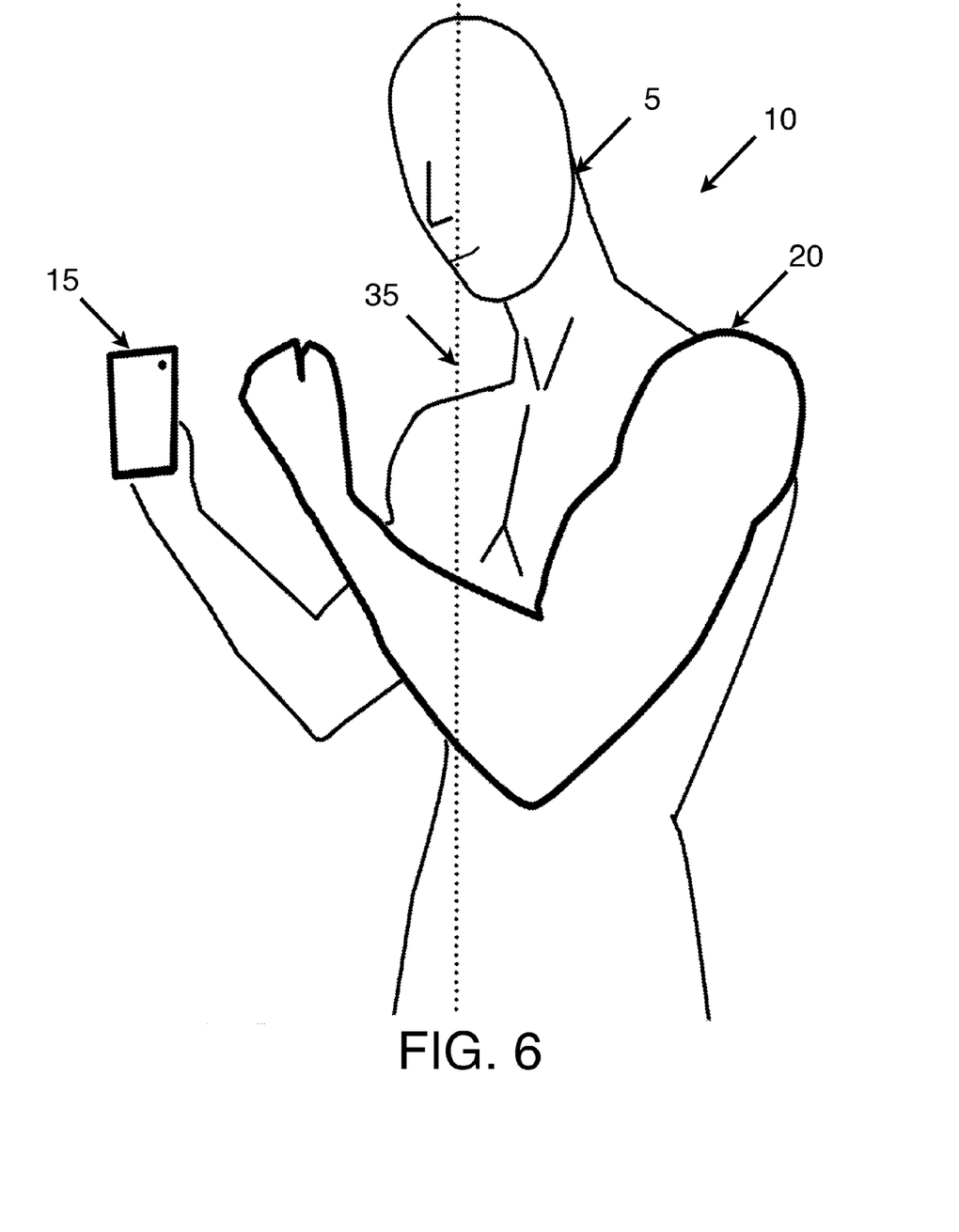
FIG. 6 illustrates another embodiment of the invention how an image can be captured with an angle.

FIG. 6 illustrates another embodiment of the invention how an image can be analyzed for angular shift. The embodiment of the invention can calibrate the angle between the camera device 15 and the mirror 10, and use the information of the viewing plane 55 and an object 20 plane to calibrate the object 20 plane in the image when the object 20 plane is known in regard to the mirror.

Software can locate the camera device 15 in the image taken in a mirror 10 and use the dislocation from the camera device optical axes (center of the image) 35 to calculate angular shift. The angle is found as described in FIG. 7. The angle in the two dimensional image are decoupled Cartesian coordinates, and are calculated separately from the two axes perpendicular to the optical axis 35.

Figure 7:
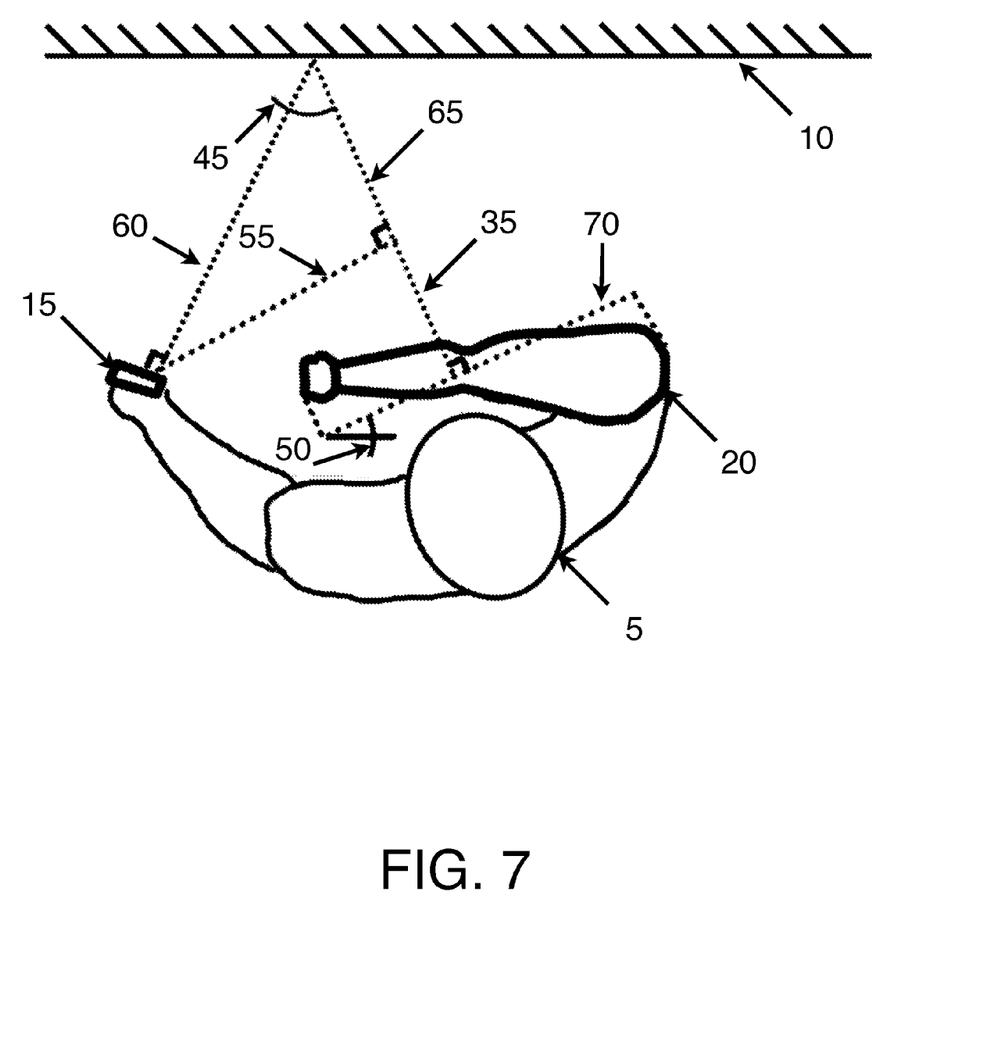
FIG. 7 illustrates another embodiment of the invention how absolute length calibration can be calculated from an angle.

FIG. 7 illustrates the embodiment the invention of FIG. 6 in one orthogonal direction, how absolute length calibration can be calculated from angular shift. The optical axis is in plane with the FIG. 7. The angle 45 can be calculated from the Field of View multiplied with the ratio of the pixel length from the camera device optical axis 35 to half the pixel length of the image.

The length per pixel calibration 300 for the camera device 15 viewing plane 55 is calibrated by projecting the camera device 15, onto the plane with the cosine of the angle 45.

The angular shift will decrease the visual length of an object according to projection of the object plane onto the viewing plane. The absolute length of an object 20 plane parallel to the mirror 10 will therefore be, the measured length 70 divided by cosine of angle 50. Angle 50 is half of angle 45.

Figure 8:
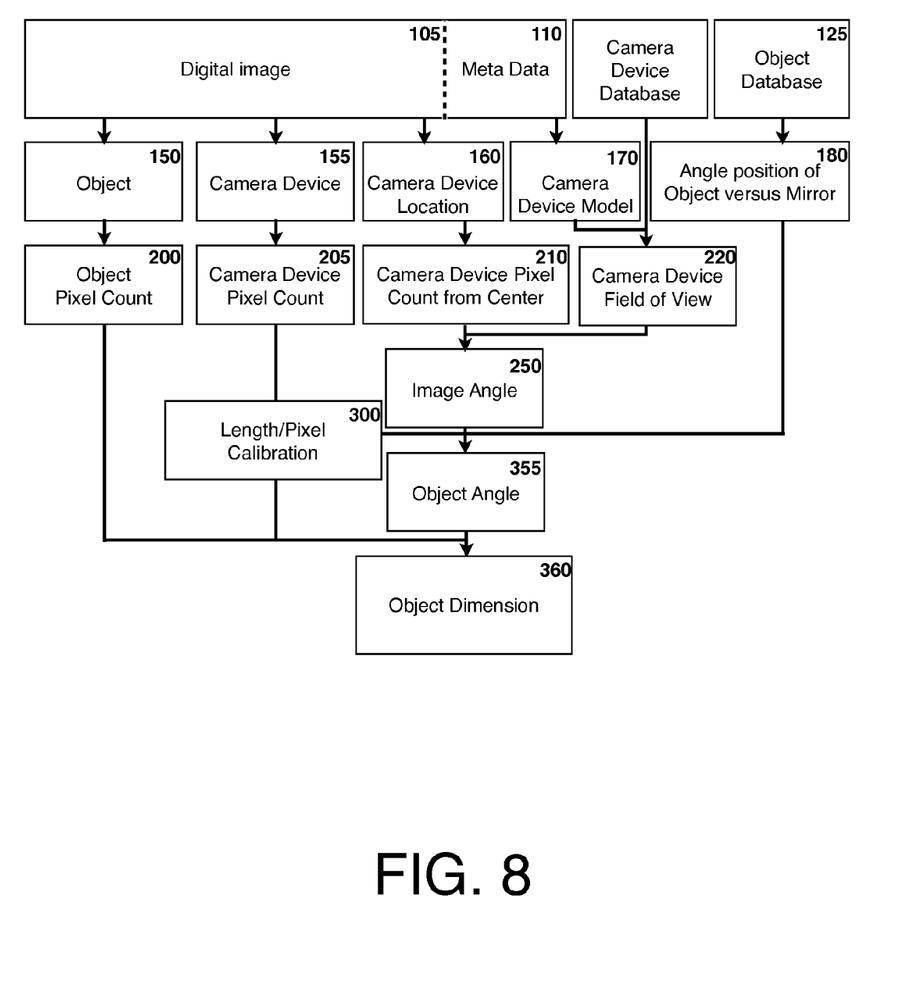
FIG. 8 illustrates a block diagram of image software of another embodiment of the invention how software can be used for measuring the absolute length of a part of an image with an angle.

In FIG. 8 of above embodiment of the invention, software will find the image of the camera device 155 in an image 105 and determine the location of the camera device 160 in the image. The camera device model 170 is looked up in a table or database 120 to find the Field of View 220. The image angle 250 is calculated from the camera device pixel count from the center 210 and the Field of View 220. This can be transferred to the object angle 355 knowing that the object 20 plane is positioned in a certain way in relation to the mirror 180, for example parallel to the mirror 10. The pixel count of the object 200, together with the length per pixel calibration 300, as described above, together with the angle to the object 355 plane will give the absolute length dimensions of the object 360.

The angular shift and the perspective can be used together. In the example mentioned above the distance to the camera device viewing plane 55 will be shifted towards the mirror 10 away from the user 5. The distance between the object 20 plane and the viewing plane 55 can be calculated by linear algebra, subtracting the object 20 plane by the viewing plane 55 and multiplying with the unit vector perpendicular to the viewing plane 55, and parallel to the optical axis 35. This distance can then be used to calculate the perspective calibration factor of each point of object 20 plane relative to the viewing plane 55 by the distance to the object 20 plane divided by the distance to the viewing plane 55. E.g. in FIG. 7, points in the object 20 plane being closer to the camera device 15, will be at a closer distance to the viewing plane 55 than points in the object 20 plane father from the camera device 15. In FIG. 7, will the hand on the arm 20 appear larger, and the shoulder of the arm 20 appears smaller on the image and the perspective calibration factor will be accordingly the inverse of those distances.

Figure 9:
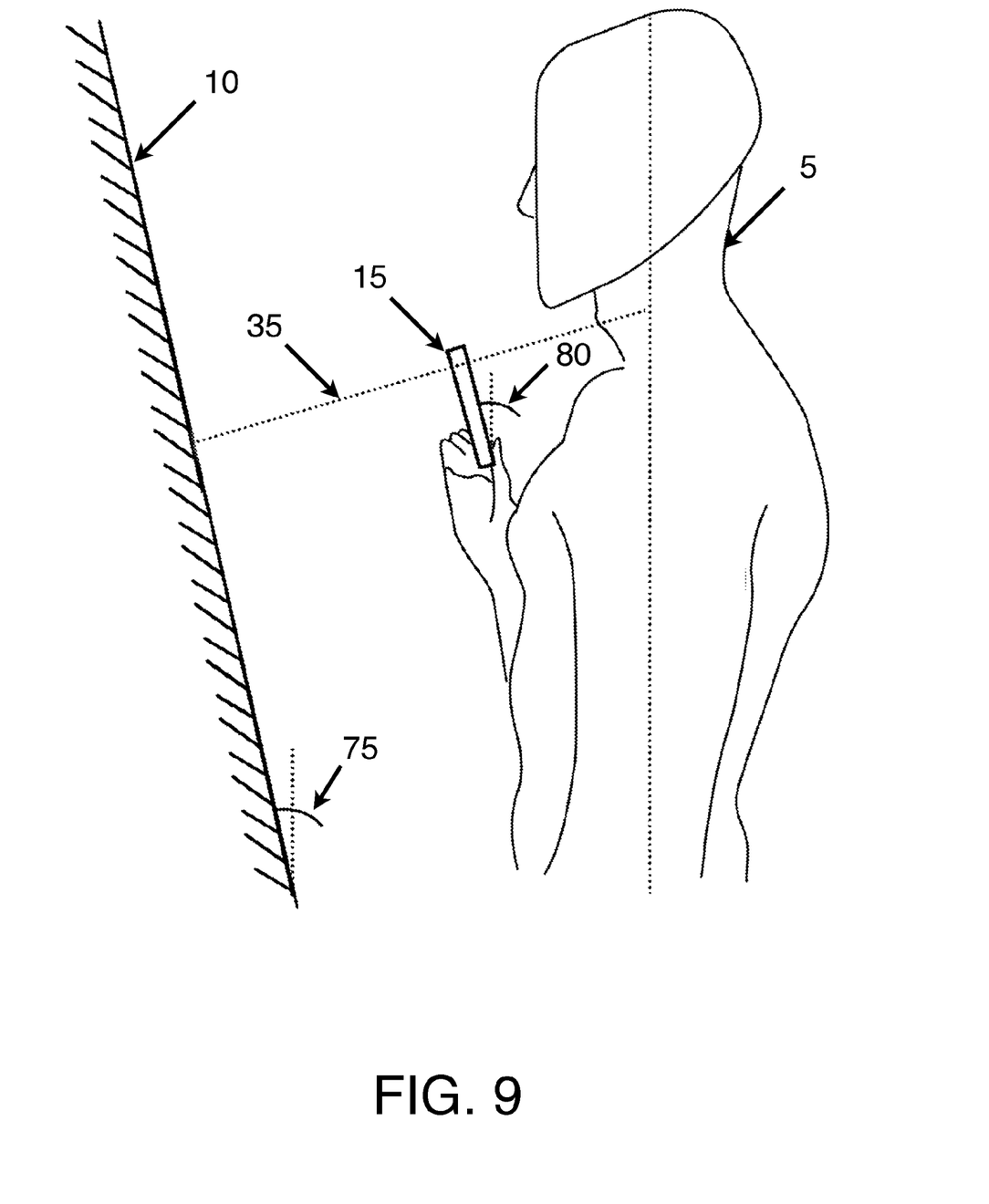
FIG. 9 illustrates a camera device using a gyroscope to calculate the angular tilt of the reflecting object used to calculate angular distortion.

FIG. 9 illustrates a camera device 15 using a gyroscope or a magnetometer to calculate the angular tilt of the reflecting object used to calculate angular shift. The embodiment of the invention can calibrate the angle for the mirror 10, and use the information for the viewing plane 55 and an object 20 plane to calibrate the object 20 plane in the image when the object 20 plane is known in regard to a common coordinate system.

In this application, the camera device 15 contains a gyroscope or a magnetometer 115, which can register the angular tilt 80 of the camera device 15. The user 5 plane can be assumed to be known, either by instructions or empirical/statistical values, e.g. that the user 5 is standing straight. The mirror 10 will have the same angular tilt 75 as the camera device's 15 angular tilt 80, if the camera device 15 is on the optical axis 35. The object in this example will have the negative angular tilt to the image plane as the camera device tilt 80. Angle and perspective of the user 5 regarding to the viewing plane 55, can be calibrated in the same manner as explained above.

Figure 10:
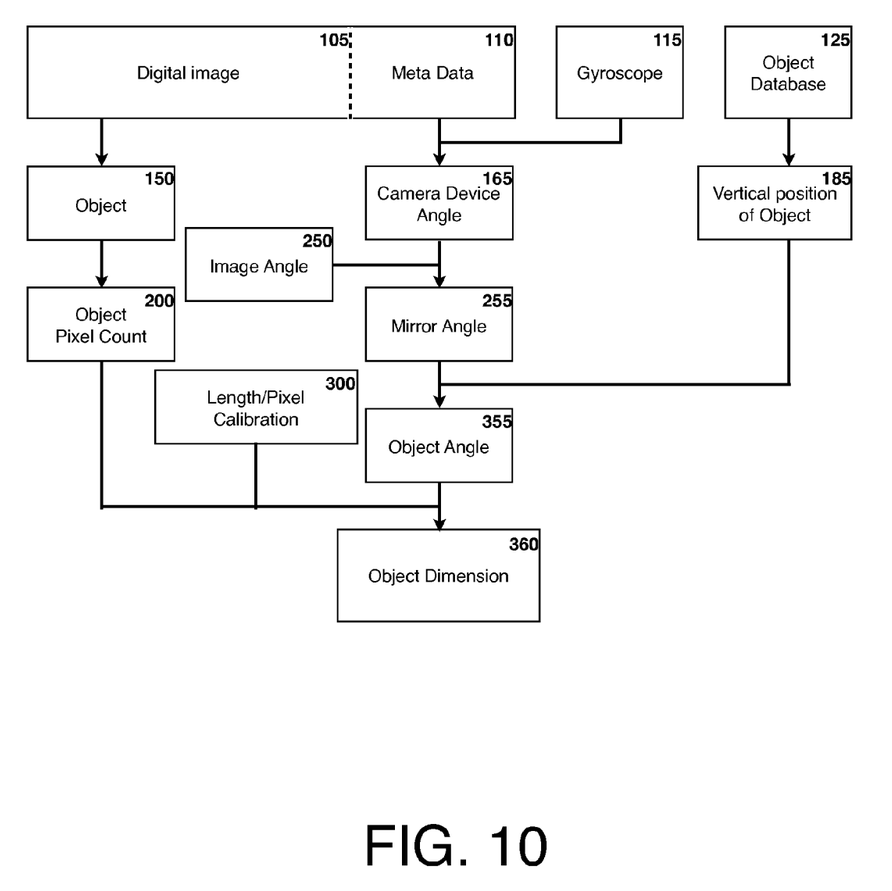
FIG. 10 illustrates a block diagram of image software for an image taken with a gyroscope, how software can be used for measuring the absolute length of a part of an image with a tilted mirror.

FIG. 10 illustrates a block diagram of image software for an image taken with a gyroscope or magnetometer, how software can be used for measuring the absolute length for a part of an image with a tilted mirror. In software the angular tilt of the camera device 15 can be registered by a gyroscope or magnetometer 115 at the same time as the image 105 is captured or by metadata 110. Calculation of the viewing angle 250, mentioned above, together with the camera device angle 165, will give the mirror angle 255. Knowledge of the user vertical position 185 can be looked up internally in a database or on the web 125 from instructions or empirical/statistical values. These data 185 together with the mirror angle 255, will give the object angle 355. Calculated length per pixel calibration 300, together with the pixel count of the object 200, and the object angle 355, gives the absolute length dimensions of the object 360.

Angular shift and perspective can be calculated and used for this embodiment of invention in the way described before.

Figure 11:
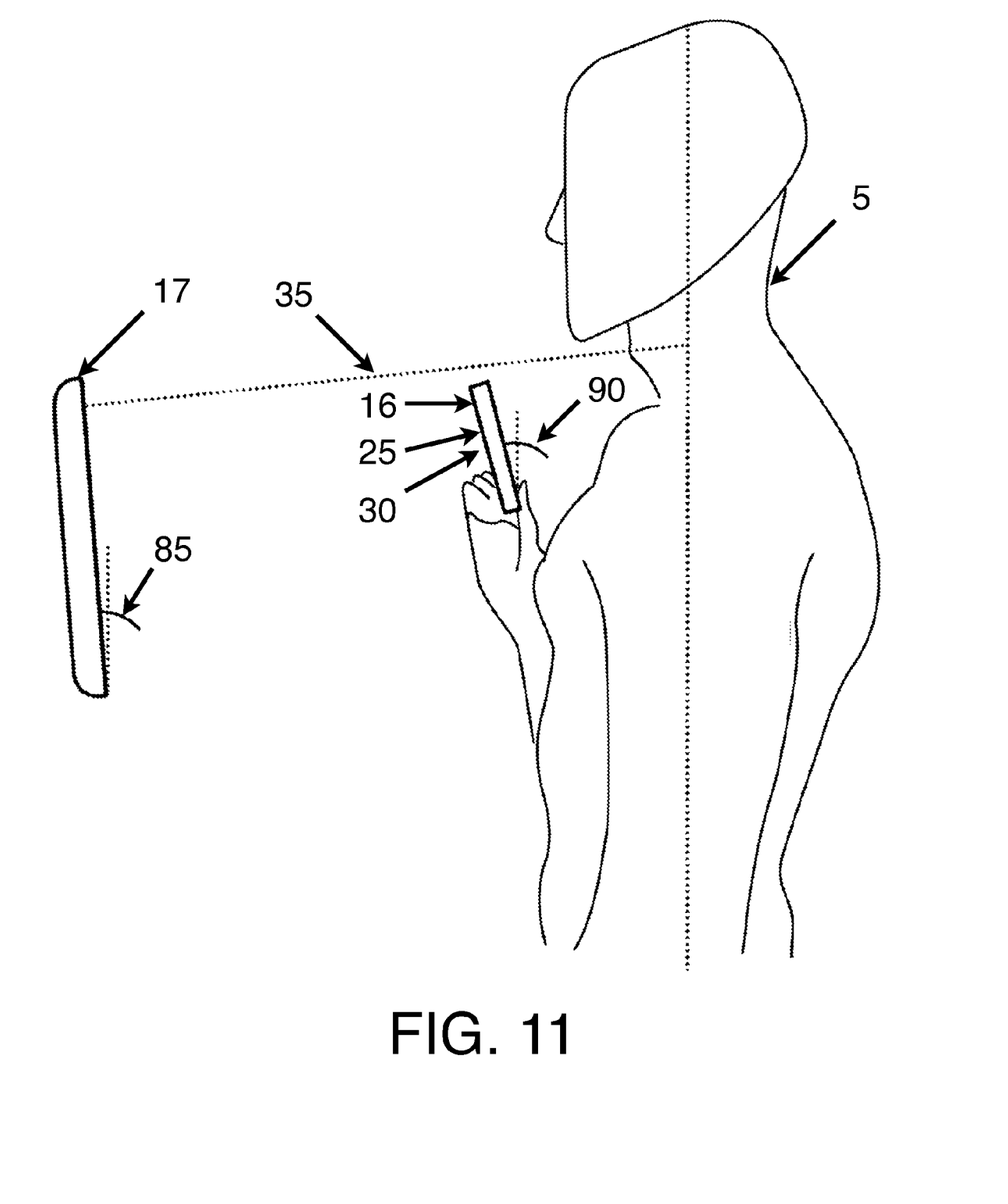
FIG. 11 illustrates an absolute length calibration for a part of an image using a remote control device paired with a capturing camera device.

FIG. 11. The invention can also be used where, e.g. a camera device 15 is used as a remote control device 16 for another capturing camera device 17, e.g. a tablet PC, which is paired with the remote control device 16 e.g. by Wi-Fi, Bluetooth, or Infrared connection. The image meta data or the software will have information about the remote control device 16. The calibration for an object 20, not shown in the figure, can use any of the characteristics 25 of the remote control device 16, or a digital calibration image 30 on the remote control device 16, or the remote control device itself 16. The calibration is conducted in the same manner as described in FIG. 1 to FIG. 3.

The tilt 90 of the remote control device 16 together with the tilt 85 of the capturing camera device 17 can also be used to specify the length per pixel calibration 300 of the remote control device 16 by the cosine relation as mentioned earlier. The tilt 85 of the capturing camera device 17 can also be used to calculate angular shift and perspective, of the object 20 as mentioned earlier. This is because the angle between the user 5 and the optical axis 35 is known, by knowing e.g. that the user 5 or the object 185 is in a vertical position.

Additional examples of embodiments and inventions are provided below.

1. A method of performing an absolute length calibration for an object (20) located with or covered by a remote control device (16) in an image, captured by a paired capturing camera device (17), the method comprising the steps of:
    pairing a remote control device (16) with a capturing camera device (17), by Wi-Fi, Bluetooth, Infrared connection, USB, or other type of communication,
    determining a length of the remote control device (16) based on the type of the remote control device (16),
    capturing an image with the capturing camera device (17) using the remote control device (16), of the remote control device (16) and the object (20),
    measuring a length of the image of the object (20) and measuring the length of the image of the remote control device (16) from the captured image,
    dividing the determined length of the remote control device (16) with the measured length of the image of the remote control device (16) to get a calibration factor, and
    multiplying the measured length of the image of the object (20) with the calibration factor to calibrate the length of the object (20).
2. Method according to example 1, the length of remote control device (16) comprises width of the remote control device (16), length of a screen on the remote control device (16), width of a screen on the remote control device (16), or a length of a pattern on the remote control device (16).
3. Method according to example 1, the length of the remote control device (16) comprises a length of an on-screen digital calibration object (30) which length is based on the on-screen digital calibration object (30) on the remote control device (16).
4. Method according to example 1, the length of the remote control device (16) comprises a projection of a length of a tilted remote control device (16), the tilt of the remote control device (16) registered by gyroscope or magnetometer build-in the remote control device (16), onto an tilted capturing camera device (17) viewing plane, the viewing plane registered by a gyroscope or a magnetometer build-in the capturing camera device (17).
5. A method of performing an absolute distance calibration to a remote control device (16) in an image, the image captured by a paired capturing camera device (17) the method comprising the steps of:
    pairing a remote control device (16) with a capturing camera device (17), by Wi-Fi, Bluetooth, Infrared connection, USB, or other type of communication,
    determining a length of the remote control device (16) based on the type of the remote control device (16),
    capturing an image with the capturing camera device (17) using the remote control device (16), of the remote control device (16) and the object (20),
    determining Field of View, registered by meta data or image capturing software, or based on the type of capturing camera device (17) for a fixed focal length capturing camera device (17),
    measuring the length of the image of the remote control device (16) from the captured image,
    dividing the length of the image of the remote control device (16) with the total length of the image, and multiplying with the Field of View of the capturing camera device (17) to get a view angle, and
    calibrating the absolute distance to the remote control device (16) from the capturing camera device (17) according to the tangent of the view angle and determined length of the remote control device (16).
6. A method of performing an absolute distance calibration to a object (20) plane from capturing camera device (17) in an image, captured by a paired capturing camera device (17) according to example 5, the absolute distance a remote control device (16) comprises a known absolute distance between an object (20) plane and the remote control device (16), and a known angle between the object and the angled capturing camera device (17) viewing plane registered by gyroscope or magnetometer inside of the capturing camera device (17), and added to the absolute distance calibration to the remote control device (16).
7. A method of performing an absolute length calibration of an object (20), the absolute distance to the object (20) plane according to example 6, the method comprising the steps of:
    pairing a remote control device (16) with a capturing camera device (17), by Wi-Fi, Bluetooth, Infrared connection, USB, or other type of communication
    determining a length of the remote control device (16) based on the type of the remote control device (16),
    capturing an image with the capturing camera device (17) using the remote control device (16), of the remote control device (16) and the object (20),
    determining Field of View, registered by meta data or image capturing software, or based on the type of capturing camera device (17) for a fixed focal length capturing camera device (17),
    measuring the length of the image of the remote control device (16) from the captured image,
    dividing the length of the image of the remote control device (16) with the total length of the image, and multiplying with the Field of View of the capturing camera device (17) to get a view angle, dividing the absolute distance to the object (20) plane for each point in the image, with the calibrated absolute distance to the capturing camera device (17) viewing plane, to get a perspective calibration factor for each point in the image, multiplying for each point in the image with the reciprocal projection of the object (20) plane onto the camera device (15) viewing plane, to get a projection calibration for each point in the image, multiplying the calibration factor with the perspective calibration factor and the projection calibration factor for each point in the image, to obtain a object calibration factor for each point in the image, and integrating the points with the object calibration factor over the length of the object (20) in the image to obtain the absolute length calibration of the object (20).

The invention claimed is:

1. A method of performing an absolute length calibration for an object (20) located with or covered by a camera device (15) in a mirror (10), the method comprising the steps of:
   determining a length of the camera device (15) based on the type of the camera device (15),
   capturing an image, using the camera device (15), of the camera device (15) and the object (20),
   measuring a length of the image of the object (20) and measuring the length of the image of the camera device (15) from the captured image,
   deriving a calibration function from the determined length of the camera device (15) and the measured length of the image of the camera device (15), and
   using the measured length of the image of the object (20) and the calibration function to calibrate the length of the object (20).

2. The method according to claim 1, the length of the camera device (15) comprises lens diameter of the camera device (15), lens to edge length of the camera device (15), width of the camera device (15), height of the camera device (15), length of a screen on the camera device (15), width of a screen on the camera device (15), or a length of a pattern on the camera device (15).

3. The method according to claim 1, the length of the camera device (15) comprises a length of an on-screen digital calibration object (30) which length is based on the on-screen digital calibration object (30) on the camera device (15).

4. The method according to claim 1, wherein the method uses image recognition, to find a logo, a text, graphics, a length to width ratio, a contour geometry, a lens location, or visible details (25) present on a camera device (15) to determine the type of the camera device (15).

5. A method of performing an absolute distance calibration to a camera device (15) viewing plane in an image captured in a mirror (10), the method comprising the steps of:
   determining a length of the camera device (15) based on the type of the camera device (15),
   capturing an image, using the camera device (15), of the camera device (15),
   determining Field of View, the Field of View registered by meta data or image capturing software, or based on the type of camera device (15) for a fixed focal length type camera device (15),
   measuring the length of the image of the camera device (15) from the captured image,
   deriving a view angle from the length of the image of the camera device (15), the total length of the image, and the Field of View angle of the camera device (15), and
   using the view angle and the determined length of the camera device (15) to calibrate the absolute distance to the camera device (15) viewing plane.

6. The method according to claim 5, further comprising steps for performing an absolute angular calibration between a camera device (15) and a mirror (10), in an image captured by the camera device (15), the method comprising the steps of:
   capturing an image, using the camera device (15), of the camera device (15),
   determining Field of View, the Field of View registered by meta data or image capturing software, or based on the type of camera device (15) for a fixed focal length type camera device (15),
   measuring the length from the center of the image to the image of the camera device (15) in the captured image, and
   deriving the absolute angle calibration between the camera device (15) and the mirror (10) from the measured length, the total image length, and the Field of View angle.

7. The method according to claim 6, further comprising steps for performing an absolute angular calibration of a mirror (10), where the absolute angular calibration between the camera device (15) and the mirror (10) comprises an absolute angular calibration between a camera device (15) and a mirror (10) and a registered tilt of the camera device (15), the tilt by means of a gyroscope or a magnetometer built into the camera device (15), and the registered tilt is subtracted from the absolute angular calibration between the camera device (15) and the mirror (10) to obtain the absolute angular calibration of the mirror (10).

8. The method of performing an absolute distance calibration to an object (20) plane according to claim 5, the absolute distance calibration to the camera device (15) viewing plane comprises a known distance between an object (20) plane and a camera device (15) viewing plane the distance known by instruction to a user (5), statistical user behavior, or empirical collected data and the distance added to the absolute distance calibration to the camera device (15) to obtain the absolute distance calibration to the object (20) plane.

9. The method of performing an absolute distance calibration to an object (20) plane according to claim 5, the absolute distance calibration to the camera device (15) viewing plane, the method comprising creating a vector by:
   a known distance between an object (20) and a camera device (15), the distance known by instruction to a user (5), statistical user behavior, or empirical collected data,
   the camera device (15) viewing plane angle relative to a mirror (10) from the absolute angular calibration angle according to claim 6,
   a known object plane to a mirror (10) angle, the angle known by instruction to a user (5), statistical user behavior, or empirical collected data,
   and using the vector and the unit vector of the perpendicular camera device (15) viewing plane to get a scalar distance, the scalar distance added to the absolute distance calibration to the camera device (15) to obtain the absolute distance calibration to the object (20) plane.

* * * * *